(12) United States Patent
Jeon et al.

(10) Patent No.: US 8,914,435 B2
(45) Date of Patent: Dec. 16, 2014

(54) UBIQUITOUS NOTIFICATION METHOD AND SYSTEM FOR PROVIDING 3A BASED PUSH TYPE EVENT

(75) Inventors: Chan Seok Jeon, Seou (KR); Jeong-Hun Moon, Seongnam-si (KR)

(73) Assignee: NHN Corporation, Gyeonggi-do (KR)

( * ) Notice: Subject to any disclaimer, the term of this patent is extended or adjusted under 35 U.S.C. 154(b) by 368 days.

(21) Appl. No.: 12/600,406

(22) PCT Filed: May 6, 2008

(86) PCT No.: PCT/KR2008/002528
§ 371 (c)(1),
(2), (4) Date: Nov. 16, 2009

(87) PCT Pub. No.: WO2008/140201
PCT Pub. Date: Nov. 20, 2008

(65) Prior Publication Data
US 2010/0161722 A1    Jun. 24, 2010

(30) Foreign Application Priority Data

May 16, 2007    (KR) .................... 10-2007-0047507

(51) Int. Cl.
*G06F 15/16*    (2006.01)
*G06Q 10/10*    (2012.01)

(52) U.S. Cl.
CPC .................................. *G06Q 10/107* (2013.01)
USPC ........................................ 709/203; 709/206

(58) Field of Classification Search
CPC ....... H04L 67/26; H04L 63/10; H04L 12/587; H04L 51/24
See application file for complete search history.

(56) References Cited

U.S. PATENT DOCUMENTS

| | | | |
|---|---|---|---|
| 2003/0050046 A1* | 3/2003 | Conneely et al. | 455/412 |
| 2005/0278344 A1* | 12/2005 | Horvitz et al. | 707/10 |
| 2006/0104306 A1* | 5/2006 | Adamczyk et al. | 370/466 |

FOREIGN PATENT DOCUMENTS

| | | |
|---|---|---|
| JP | 2005-012264 | 1/2005 |
| KR | 10-2005-0113034 | 1/2005 |
| KR | 10-2005-0080948 | 8/2005 |
| KR | 10-2006-0067183 | 6/2006 |
| KR | 10-2006-0081369 | 7/2006 |
| WO | 2005/045646 | 5/2005 |
| WO | 2006/101428 | 9/2006 |

* cited by examiner

*Primary Examiner* — Peling Shaw
(74) *Attorney, Agent, or Firm* — Harness, Dickey & Pierce, P.L.C.

(57) ABSTRACT

The present invention relates to a ubiquitous notification method and system for managing a member list in a relay platform and providing events of each service provided by a service provider based on 3A (Anytime, Anywhere and Any device) by integrating and integrally managing the events through one route so that a subscriber can integrally manage his event profile, and the service provider can provide subscription authorities of the event push service through a consistent interface. The method according to the present invention includes steps of being pushed an event linked with a service and transmitting an event message in response to the pushed event.

38 Claims, 10 Drawing Sheets

FIG. 6

| NAME | MEANING |
|---|---|
| /boog/newGuestBook | BLOG NEW POST ALERT CHANNEL |
| /photo/sports | PHOTO SERVICE SPORTS CHANNEL |
| /news/economy | ECONOMY NEWS CHANNEL |
| /miz/baby | MIZNET PREGNANCY/CHILD REARING CHANNEL |
| /café/10230030/44 | NO. 44 BOARD CHANNEL OF CAFEID 10230030 CAFÉ |

FIG. 9

| DATA TYPE | DESCRIPTION |
|---|---|
| U8 | INTEGER BETWEEN 0 AND 255 |
| I8 | INTEGER BETWEEN -128 AND 127 |
| U16 | INTEGER BETWEEN 0 AND 65535 |
| I16 | INTEGER BETWEEN -32768 AND 32767 |
| U32 | INTEGER BETWEEN 0 AND 4294967926 |
| I32 | INTEGER BETWEEN -2147483648 AND 2147483647 |
| String 1 | CHARACTER STRING WITHIN 255 (THE FIRST BYTE IS LENGTH, THEN CHARACTER STRING) |
| String | CHARACTER STRING WITHIN 65535 (THE FIRST TWO BYTES ARE LENGTH, THEN CHARACTER STRING) | ns to realize the present invention will be provided below by referring to the attached drawings. In the drawings, like reference numbers are used to refer to like elements. Also, in the following description of the present invention, detailed explanations of known related functions and structures may be omitted to avoid unnecessarily obscuring the subject matter of the present invention.

UBIQUITOUS NOTIFICATION METHOD AND SYSTEM FOR PROVIDING 3A BASED PUSH TYPE EVENT

CROSS-REFERENCE TO RELATED APPLICATIONS

This application is the National Stage of International Application No. PCT/KR2008/002528, filed May 6, 2008, and claims priority from and the benefit of Korean Patent Application No. 10-2007-0047507, filed on May 16, 2007, which are both hereby incorporated by reference for all purposes as if fully set forth herein.

BACKGROUND OF THE INVENTION

1. Field of the Invention

The present invention relates to a ubiquitous notification method and system, and more particularly to a ubiquitous notification method and system for providing 3A (Anytime, Anywhere and Any device) based push events.

2. Discussion of the Background

FIG. 1 shows an existing method of notifying events. Referring to FIG. 1, a user terminal such as a desktop computer, a notebook computer, a cellular phone and a PDA (personal digital assistant) can have an access to various sets of information provided by application servers, which are providers, through networks such as the Internet and public networks. Here, a user can become a member of a website or a blog operated by application servers by registration so that necessary event information can be notified out of much new updated information.

However, in order to be notified of such events, the user should subscribe to event information by separately connecting to the applications such as the website and blog of each service provider, so it is difficult for an event-related profile such as a change, addition and deletion of subscription to be integrally managed, which is a problem.

Further, the service provider should separately process the change, addition and deletion of the user's subscription related with the event notification, and grant registration-related authorizations, so the authorizations are not provided through an integrated interface, which is a problem.

Likewise, the existing event push service has been provided through a high-speed Internet line using a fixed computer, but recently, as the society moves to a ubiquitous era, such services are starting to be provided through various ubiquitous devices, and ubiquitous services are provided anytime and anywhere not only through a personal computer, a cellular phone and a PDA, but also through various devices such as a terminal that supports wireless Internet or mobile Internet, a refrigerator connected to LAN (Local Area Network), a microwave oven, an electric rice-cooker, an automatic vending machine and a memory stick. Ubiquitous services are proactive services where services approach a customer rather than the customer approaches the services.

Hence, greeting the ubiquitous era, there is a need for a push-type infrastructure for easily and efficiently delivering events generated in each application service to individual customers by integrating the events, and because it is practically difficult for the application server to provide various types of ubiquitous devices for each service, there is a need for a relay platform for appropriately processing push-type events in accordance with the device.

SUMMARY OF THE INVENTION

Therefore, the present invention has been made in view of the above problems, and it is an object of the present invention to provide a ubiquitous notification method and system for managing a member list in a relay platform and providing events of each service provided by a service provider based on 3A (Anytime, Anywhere and Any device) by integrating and integrally managing the events through one route so that a subscriber can integrally manage his event profile, and the service provider can provide subscription authorizations of the event push service through a consistent interface.

It is another object of the present invention to provide a ubiquitous notification method and system for operating an appropriate broker connection to notify events corresponding to the ubiquitous user terminal, and providing event push services in a manner that is appropriate to the user terminal regardless of the type of the user terminal through a directory that registers the service types, event types, and event formats and meanings.

It is another object of the present invention to provide a ubiquitous notification method and system for processing super-large storage transactions of the server by distributed-processing events, which are integrated in the relay platform and are integrally managed, by services and events, and parallel-processing the events so that all types of events the service provider intends to provide can be provided to the user regardless of the amount of such events.

It is yet another object of the present invention to provide an ubiquitous notification method and system for providing an integrated push service that is appropriate for ubiquitous devices by implementing the above technologies through small modifications of the legacy service that has been provided, and providing a ubiquitous connection ring by which a user can get closer to the services, thereby contributing to the development of the services.

In accordance with an aspect of the present invention, the above and other objects can be accomplished by the provision of a ubiquitous notification method comprising: being pushed an event linked with a service; and transmitting an event message in response to the pushed event. Here, the transmitting of the event message distinguishes various types of each ubiquitous subscriber terminal, and transmits the event message using a communication method that is supported by the corresponding terminal. Further, the communication method includes one or more methods of TCP/IP (Transmission Control Protocol/Internet Protocol), SMS (Short Message Service), UDP (User Datagram Protocol) and P2P (Peer to Peer).

The method may further comprise: receiving at least one channel linked with the service provided from the service provider and a UED (UnotS Event Description) file to register the channel and the UED file as provider information before being pushed the event, wherein the event is pushed in a data format indicated in the UED file when being pushed the event. Here, the UED file is configured using an XML (eXtensible Markup Language).

Further, the transmitting of the event message distinguishes various types of each subscriber terminal, and includes the event message in the data according to the binary protocol of a data type supported by the corresponding terminal to transmit the data. Further, the transmitting of the event message may include the event message in XML-type data, regardless of each subscriber terminal-type.

In accordance with another aspect of the present invention, the ubiquitous notification method comprises: collecting events pushed from a service provider, integrating a plurality of events collected to integrally manage the events, and transmitting an event message of a data type supported in a terminal to at least one terminal that registered by subscription to at least one event reception intended to be pushed from among the events using a communication method that is supported in the terminal using a push engine in between the service provider and various types of ubiquitous terminals.

In accordance with another aspect of the present invention, a method of providing an event in a terminal comprises: transmitting a subscription request of a push service; receiving at least one channel list linked with a service according to the subscription request; transmitting subscriber information including user information corresponding to the terminal and selection information for at least one channel selected by a user from the channel list; and receiving an event message for a channel corresponding to the subscriber information.

The method may further comprise, after transmitting the subscriber information: transmitting a request for a UED file for an interface with a user; and receiving a UED file according to the UED file request. Here, the event message is received in the form of data according to a binary protocol of a data type indicated in the UED file in the step of receiving the event message.

The method may further comprise, after receiving the UED file: converting the event message for the channel into a form based on a template by parsing the UED file when the UED file includes the template that indicates a message display format.

In accordance with another aspect of the present invention, there is provided a terminal for providing an event, the terminal comprising: a notification client configured to receive at least one channel list linked with a service through a request for an event push service subscription, generate and transmit subscriber information including selection information for at least one channel selected by a user from the channel list and user information corresponding to a user terminal, and receive an event message for a channel corresponding to the selection information; and a user interface configured to display the event message received through the notification client.

The terminal may further comprise: a memory configured to store a UED file for the interface with the user, wherein the UED file is received through a request for the UED file transmitted by the notification client. Here, the notification client receives the event message in the form of data according to a binary protocol of a data type indicated in the UED file.

The terminal may further comprise: a template parser configured to extract and analyze a template that indicates a message display format by parsing the UED file, wherein the user interface displays the event message in a form based on the template.

In accordance with another aspect of the present invention, there is provided a ubiquitous notification system comprising: an event gateway configured to be pushed an event linked with a service; and at least one broker configured to transmit an event message in response to the pushed event. Here, the at least one broker distinguishes various types of each subscriber terminal, and transmits the event message using a communication method that is supported by the terminal. Further, the at least one broker distinguishes various types of each subscriber terminal, includes the event message in data according to a binary protocol of a data type that is supported by the terminal to transmit the data.

The system may further comprise: a directory management unit configured to receive at least one channel linked with the service, and a UED file provided by a service provider, and to register the at least one channel and the UED file as provider information in a database, wherein the event gateway is pushed the event in a data format indicated in the UED file through reference to the database in the event gateway. Here, the directory management unit transmits the UED file for an interface with a user to a user terminal according to a request of the user terminal. Here, the at least one broker includes the event message in data according to the binary protocol of a data type indicated in the UED file to transmit the data. Further, the directory management unit manages the pushed event in channel units that represent the domain where the event belongs to for each service, and the at least one broker transmits the event message in the channel units. Here, the at least one broker transmits the event message to a terminal that has subscribed to at least one sub-channel when the channel includes at least one sub-channel.

Further, the at least one broker transmits the event message only to a user terminal corresponding to a user ID, or does not transmit the event message only to the user terminal corresponding to the user ID when the channel includes a user ID including a predetermined identifier. Further, wherein the at least one broker includes the event message in XML-type data to transmit the data, regardless of each subscriber terminal-type.

The system may further comprise: a subscription gateway configured to transmit at least one channel list linked with the service to a user terminal according to the request from the user terminal, and register user information for the user terminal and selection information about at least one channel selected by the user from the channel list as subscriber information in a database, wherein the at least one broker transmits an event message for a channel corresponding to the subscriber information with reference to the database.

In accordance with yet another aspect of the present invention, there is provided a system for providing ubiquitous notification in between a service provider and various types of ubiquitous terminals, the system comprising: a connection means configured to collect events pushed from the service provider; and a push engine configured to integrate a plurality of events collected through the connection means and integrally manage the events, and transmit an event message of a data type supported in a terminal to at least one terminal that registered by subscription to at least one event reception intended to be pushed among the events using a communication method that is supported in the terminal.

BRIEF DESCRIPTION OF THE DRAWINGS

The above and other objects, features and other advantages of the present invention will be more clearly understood from the following detailed description taken in conjunction with the accompanying drawings, in which:

FIG. 6 illustrates a channel list by events according to an embodiment of the present invention.

FIG. 9 illustrates data types defined in a UED file according to an embodiment of the present invention.

DETAILED DESCRIPTION OF THE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts, and a duplicate description thereof will be omitted.

Figure 1:
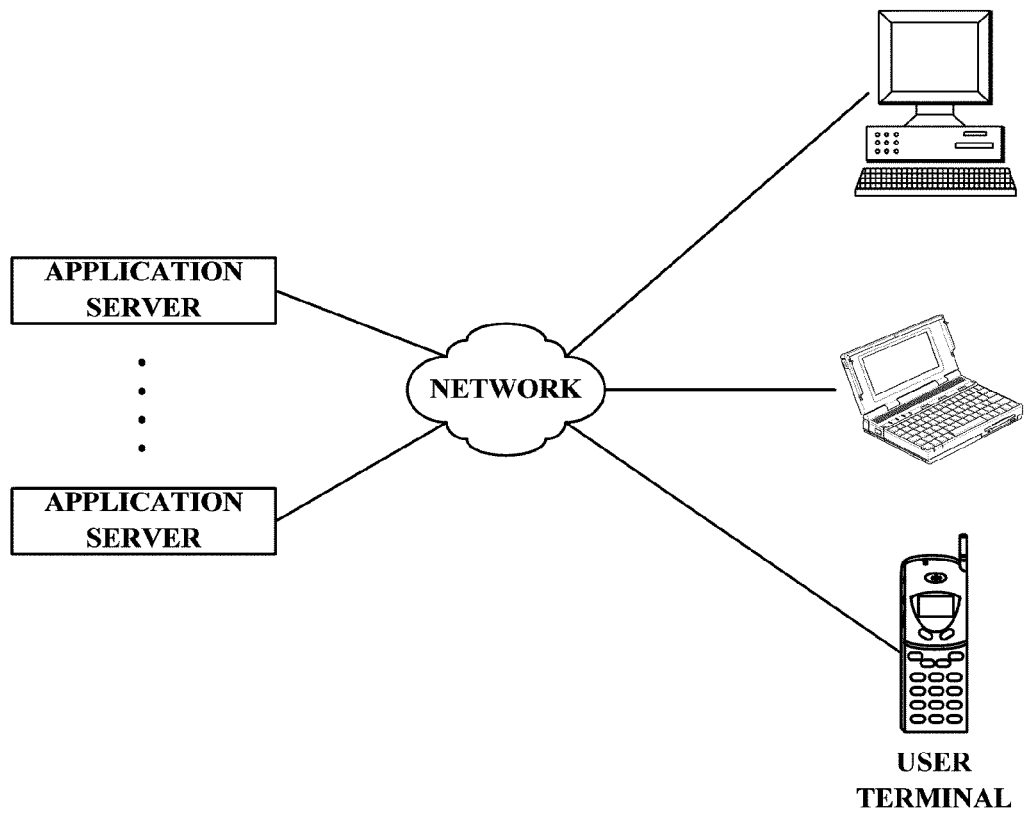
FIG. 1 illustrates an event notification method according to the prior art.
Figure 2:
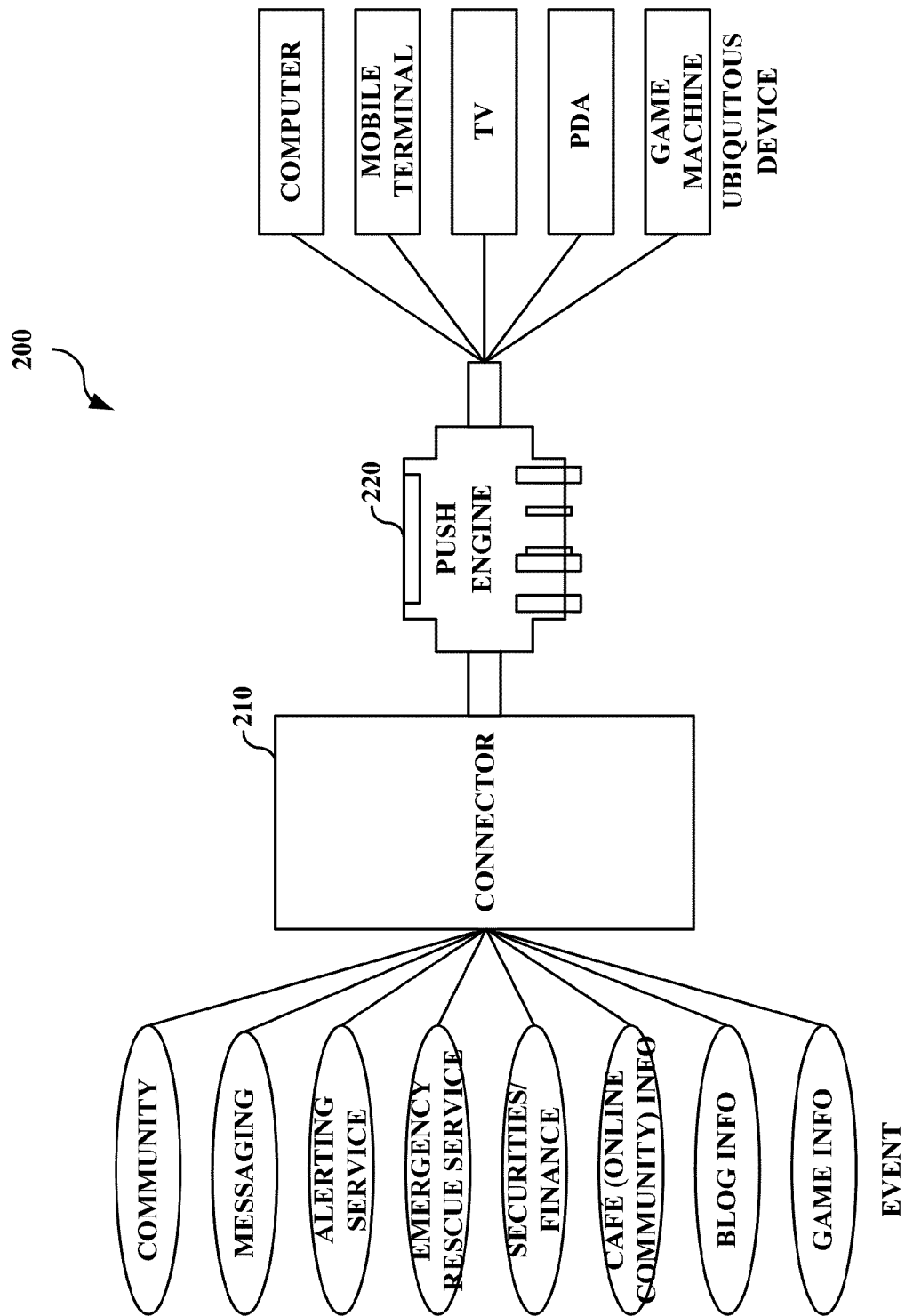
FIG. 2 illustrates the concept of an event push method of a ubiquitous notification system according to an embodiment of the present invention.

FIG. 2 illustrates a ubiquitous notification system 200 for explaining the concept of an event push method according to an embodiment of the present invention.

Referring to FIG. 2, the ubiquitous notification system 200 according to an embodiment of the present invention includes a connector 210 for collecting events of each service pushed from a service provider, and a push engine 220 that integrates and integrally manages events pushed from the service provider, and transmits the events to various types of ubiquitous devices (terminals).

The push engine 220 integrates various events related with each service pushed from one or more service providers through one route of the connector 210, and integrally manages the events. Here, each service provider can provide events related to various services including a community service such as regional information, a messaging service such as an e-mail service and SMS (Short Message Service), a notice service such as a successful bid notice, an emergency rescue service, securities/finance information, online community information, blog information, and game information.

Further, the push engine 220 can transmit an event message of a data type supported in a terminal to at least one terminal which subscribes to at least one event intended to be pushed among various ubiquitous terminals in a communication method that is supported in the terminal. Registration authorizations to services linked with the service provider are granted through the push engine 220, and the user of various types of ubiquitous devices (terminals) such as a computer, a mobile terminal, a TV, a PDA and a game machine can participate in the registration procedure for receiving the event push service through the push engine 220 anytime and anywhere, and can be provided the service.

Hence, the service provider does not directly manage the list of subscribers who desire to be pushed necessary events, but the push engine 220, which is a relay platform, manages the list. As such, the service provider can provide the registration authorizations of the event push service to the consistent interface of the push engine 220. Further, the events of each service, which are provided from the service provider, are integrated in the push engine 220 through one route, and are then integrally managed, so that the subscriber, who is provided the push-type event, can collectively manage his own event profile through the push engine 220, and the push engine 220 can provide events to the subscribers based on 3A in a manner that is appropriate to the device. As such, a ubiquitous connection ring, which can be closely adhered to the service, is provided to the user.

Such a push engine 220 can be implemented only by a little modification of a legacy service such as a push-type event provided by the service provider, and can be implemented in various forms to integrate and integrally manage push-type events to fit in ubiquitous devices and to function as a relay platform that can process mass-storage transactions by being adapted to various types of ubiquitous devices.

Figure 3:
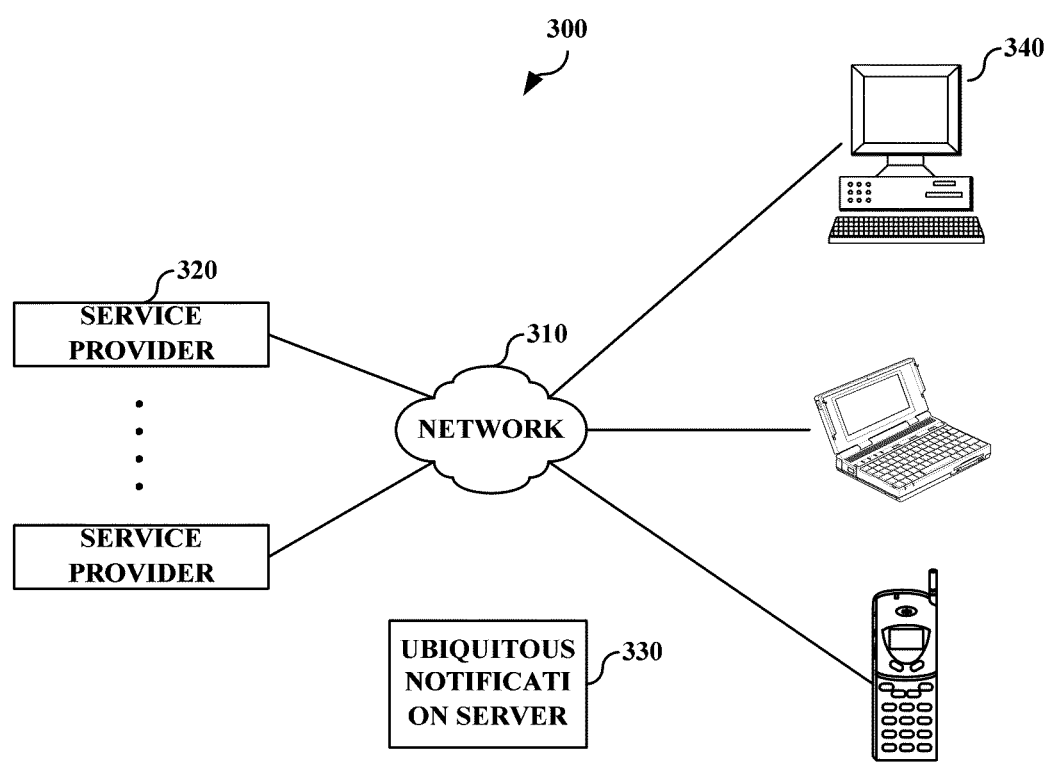
FIG. 3 illustrates a ubiquitous notification system according to an embodiment of the present invention.

FIG. 3 shows a ubiquitous notification system 300 according to an embodiment of the present invention. The ubiquitous notification system 300 according to an embodiment of the present invention includes one or more service providers 320 connected to a network 310 such as an Internet, a wireless Internet network, a mobile Internet network, a public network and a core network, user terminals 340 which are various types of ubiquitous devices, and a ubiquitous notification server 330 that serves as a platform that relays transmission of push-type events from the service provider 320 to the user terminals 340.

The service provider 320 can provide events related with various services such as a community service such as regional information, a messaging service such as an e-mail service and SMS (Short Message Service), a notice service such as a successful bid notice, an emergency rescue service, securities/finance information, online community information, blog information, and game information.

The user terminals 340, which are various types of ubiquitous devices, include a computer such as a desktop computer and a notebook computer, and a mobile terminal such as a cellular phone that uses CDMA/WCDMA network, wireless Internet or mobile Internet, a PCS phone (Personal Communications Services phone) and synchronous/asynchronous IMT-2000 (International Mobile Telecommunication-2000). The user terminals 340 can also include all types of wire/wireless electronic/communication devices such as a Palm PC (Palm Personal Computer), a PDA (Personal Digital Assistant), a smart phone, a WAP phone (Wireless Application Protocol phone), a mobile play-station, a TV that is connected to the public network or IP network, or is connected to LAN, an IPTV, a refrigerator and a microwave oven.

The ubiquitous notification server 330 integrates various events pushed from the service provider, and integrally manages the events in between the service provider 320 and the various types of ubiquitous user terminals 340, and can transmit event messages of a data type supported in at least one terminal to at least one terminal that subscribes to at least one event intended to be pushed among the events in a communication method that is supported in the terminal.

Figure 4:
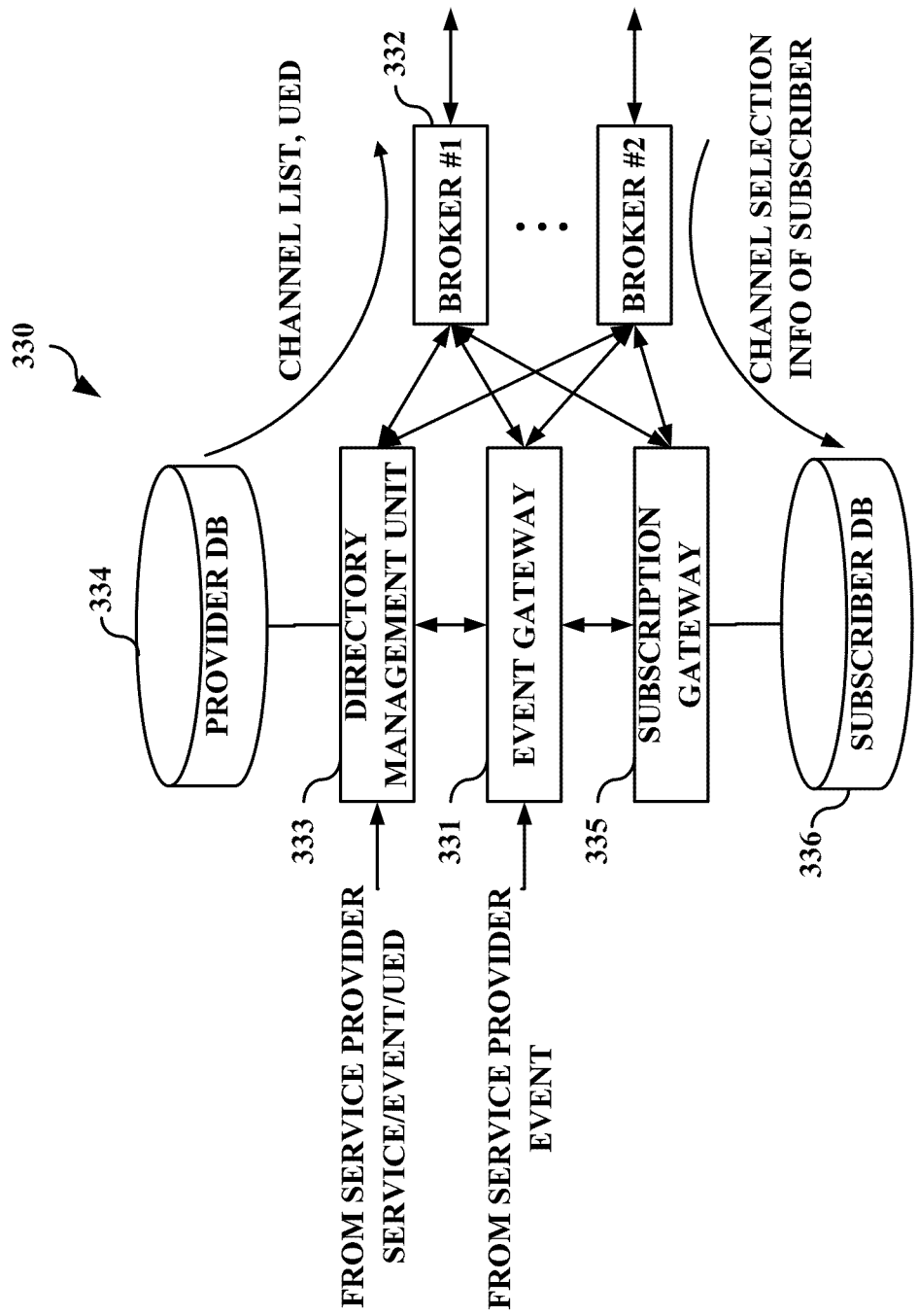
FIG. 4 is a specific block diagram illustrating the ubiquitous notification server of FIG. 3.

FIG. 4 is a specific block diagram of the ubiquitous notification server 330. Referring to FIG. 4, the ubiquitous notification server 330 includes an event gateway 331, one or more brokers 332, a directory management unit 333, a provider DB (database) 334, a subscription gateway 335 and a subscriber DB 336.

The event gateway 331 is pushed events linked with each service from the service provider 320. The events can be pushed in a manner according to a binary protocol rather than the existing text method, and adaptation layers such as HTTP (hypertext transfer protocol) and Java Class can be used to support the binary protocol. As described later, the service provider 320 connected to the event gateway 331 should be a server registered in the provider DB 334 by the directory management 333, and can be connected based on a service ID or an authentication key when trying to be connected. Later, all events transmitted from the service provider 320 are transmitted to the broker 332 that manages the user terminals 340 according to the rules stipulated in the event gateway 331.

As such, the broker 332 transmits the event messages corresponding to the pushed events to the subscriber terminal. The broker 332 transmits the event messages to the user terminal 340 based on authentication, connection management, presence management, etc. of the user terminal 340. Here, the broker 332 divides subscriber terminals into various types, and transmits the event messages in a communication method that is supported by the subscriber terminal.

The broker 332 can consist of a plurality of brokers in order to transmit the event messages after dividing the messages by communication methods to the terminals. For example, the broker 332 can support the event pushed to various ubiquitous terminals by transmitting the event messages in various communication methods that are appropriate to the terminals, such as TCP/IP (Transmission Control Protocol/Internet Protocol), SMS (Short Message Service), UDP (User Datagram Protocol) and P2P (Peer to Peer). The connection between the event and the user terminal 340 can secure the uppermost performance in connection with the event pushed to the terminal through pointer reference in a predetermined memory. In the case where the same events are distributed to a multiple of subscriber terminals by means of one broker 332, the event gateway 331 can transmit the event and the list of the receiving user terminals 340, and the broker 332 can distribute the event to each subscriber terminal recorded in the list.

Further, the broker 332, which supports various forms of communications according to the type of the user terminal 340, can be divided into connection-based brokers and non-connection-based brokers. The connection-based broker considers connected and authenticated user terminals 340 as valid clients, activates the presence signal of being connected to the event gateway 331, and transmits the events transmitted from the event gateway 331 to the subscriber terminals. The non-connection-based broker is used in an SMS-based mobile terminal, an Internet service terminal of a periodic polling method for a pop-up service. Here, the broker 332 separately manages session information. For example, a mobile phone can be considered an Always-On Device, so it can be considered that the subscription and cancellation of the service correspond to the log-in and log-out of an Internet website. However, it is possible to store subscriber information, which is information about some user terminals 340 intended to receive the event push service among the user terminals 340, in the subscriber DB through the subscription gateway 335. Further, it is possible to operate a separate DB for integrally managing the presence of the subscriber terminals in the broker 332. The broker 332 can be developed continuously, and can be added in line with the service support method of the terminal depending on the type of a device to be added Further, the broker 332 can transmit the event messages after including the messages in XML-type data without dividing various forms of each subscriber terminal depending on the necessity, but it is desirable to transmit the event messages after including the messages in a payload (data) according to the binary protocol of the data type supported by the terminal considering various forms of each subscriber terminal.

The ubiquitous notification server 330 according to the present invention was suggested to freely transmit data and to be utilized in a mobile terminal where data transmission is restrictive and the processing power is restrictive rather than in an environment where broadband data can be easily transmitted. For example, in the SMS-based message transmission, the size of the transmittable data is only about 80 bytes, so the event transmission using SMS is very restrictive in terms of the content and length. Hence, it is possible to transmit only the unique meaning of events in the form of data according to the binary protocol to easily apply to a mobile terminal where there are several restrictions.

The event itself includes a service ID and an event ID, and the service provider 320 first registers a definition of the event in the provider DB 334 through the directory management unit 333, and registers a UED (UnotS Event Description) file that defines a binary protocol for the event, and then generates events for the binary protocol. Here, the data type provided to describe the binary protocol can be defined as an integer such as 8, 16 and 32 bits or a character string function as described in the description of FIG. 9, and can be transmitted and received.

In the case where multimedia data such as images or video files are transmitted in the above data type, it is possible to transmit encoded data by utilizing functions such as String2 or String4, but in the case of such multimedia data, it is desirable to encode only the URLs (uniform resource locator) in the message, and transmit the encoded URLs. Here, the subscriber terminal analyzes the event message, and is provided the multimedia content using the server connection through the URL.

As described in the following, the subscriber terminal is connected to the directory management unit 333 at the time of subscription, and can receive the UED file managed in the provider DB 334. As such, the subscriber terminal can analyze and indicate the event messages according to the definition of the UED file in analyzing the event images transmitted from the broker 332.

Further, as partly mentioned above, the service provider 320 that generates push-type events can transmit the service ID, the event ID and the UED file in order to provide the push service for each event to the directory management unit 333, and can register the service ID, the event ID and the UED. That is, the directory management unit 333 is provided the service linkage channel that includes the service ID and the event ID from the service provider 320, and stores the channel in the provider DB 334 in the form of a directory. Here, the event-related information of the service is specifically registered by storing the UED file that defines the user interface including the data type for the event in the channel.

Likewise, the event gateway 331 is pushed the event in the data type indicated in the UED file from the service provider 320 with reference to the provider information that includes the channels linked with each service registered in the provider DB 334 and the UED file. If an event format unregistered in the provider DB 334 is transmitted from the service provider 320, the event gateway 331 rejects the event pushed.

[Example of UED Format]

```
<?xml version="1.0" encoding="euc-kr" ?>
<ued event-provider-id="[eventProviderID]" event-id="[eventID]">
<description>[brief description]</description>
<record>
<field name="[name]" type="[data type]" />
[repeat field element]
</record>
<url>[additional information URL]</url>
<template>[template to be displayed on the screen]</template>
</ued>
```

The directory management unit 333 can support easy addition and extension of events as well as a service upgrade through a version management by events. If the event format is changed by the service provider 320, the service provider 320 should register a new event in the provider DB 334 for use, and if a past event is not used, the directory management unit 333 should disable the event. The subscriber terminal can determine a policy for an unused UED, and for this, if the UED is to be deleted, can ask the directory management unit 333 the validity of the UED. According to the request of the subscriber terminal, the directory management unit 333 can transmit a new UED to the subscriber terminal to be applied in the user interface of the subscriber terminal, and the broker 332 can add the event message to the data according to the binary protocol of a data type indicated in the UED file, and transmit the data to the subscriber terminal. The directory management unit 333 already recognizes the UED where the data type appropriate for the terminal is defined, and when the subscriber terminal requests a UED, the fitting UED can be transmitted to the subscriber terminal with reference to a specification such as a model of the terminal or according to the data type specified by the subscriber.

Figure 5:
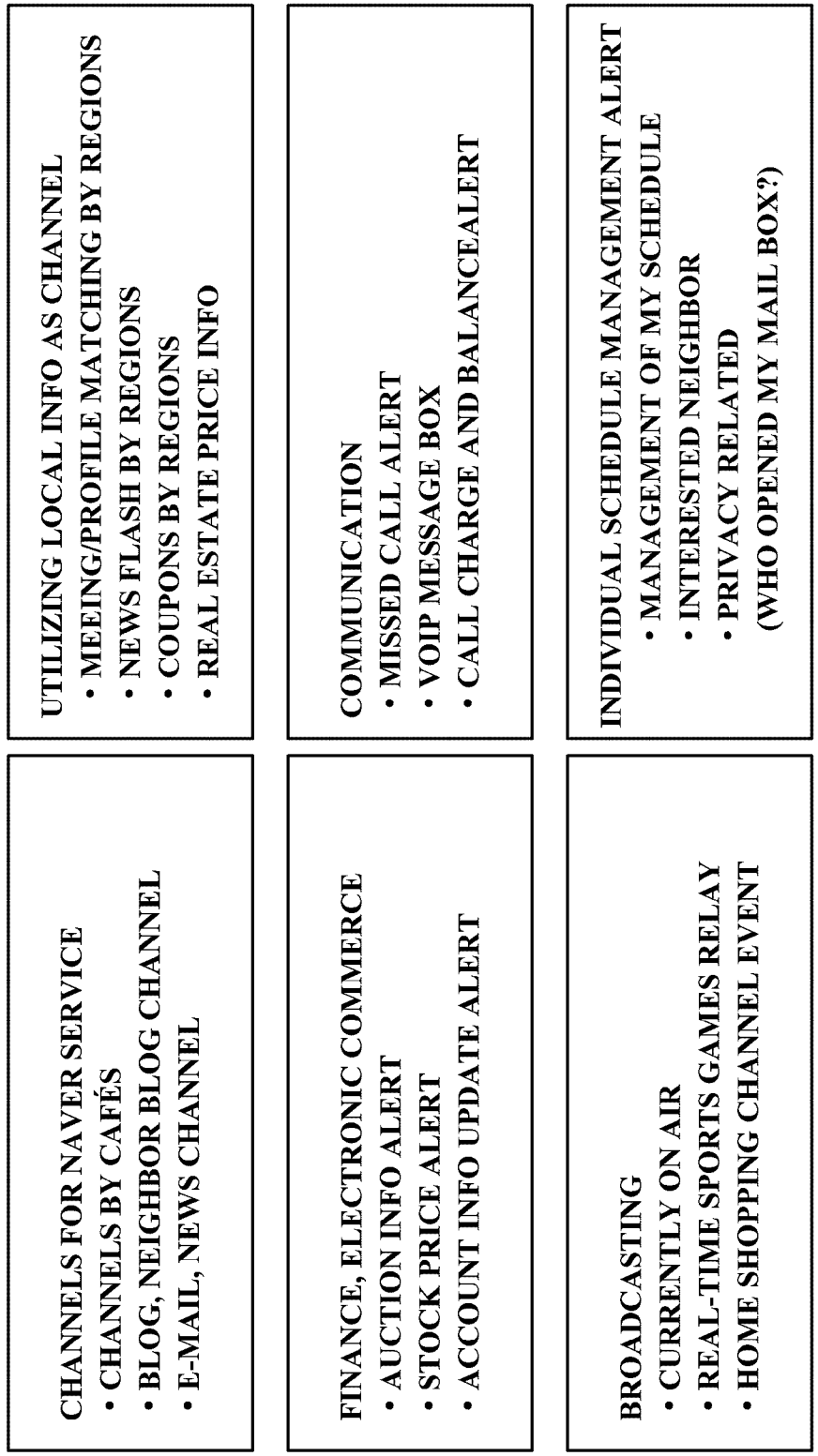
FIG. 5 illustrates services where events are expected to be generated in a ubiquitous environment.

As shown in FIG. 5, the services provided by the service provider 320 include an online community service, a blog service, an e-mail service, news, auctions related with finance/electronic commercial transactions, stock price information, account information, broadcasting-related program information, a sports hook-up, home shopping information, local information-related profile, weather forecast, coupons, real estate information, communication-related absence information, VoIP message, call charge information, personal schedule information, interested neighbor information, privacy information, etc.

The channels linked with the generation of events in each service can be defined as in FIG. 6. The directory management unit 333 manages events pushed from the service provider 320 in the channel unit that represents the domain that the event belongs to for each service, and the broker 332 can transmit event messages to the subscriber terminal in the channel unit.

The event messages can be transmitted to a certain group or individual. However, practically, on the service provider's side, it is impossible to push a certain event transmission group without considering the subscribers' opinions, and it is also difficult to manage such a list. Hence, the present invention introduces such a concept of a channel, and the event channel managed in the form of a directory in the provider DB 334 is similar to the expression of a sub-directory in the web page and can utilize the data structure of the service provider 320. The channels can freely have sub-channels, and in the case where the event is transmitted in the name of an upper channel, an event message is transmitted to the terminal registered in the channel corresponding to the logic sum of the lower channel.

That is, in the case where at least one sub-channel is included in the lower side of the channel, the broker 332 can transmit the event message corresponding to the push message provided from the service provider 320 to all terminals registered in the sub-channel of the lower side. There is no limitation of the depth of the channel, but considering the problem that the channel should be selected and registered respectively, it is desirable to have the depth of the channel up to the maximum two steps.

In the case of an individual, it is possible to indicate an individual in a manner that is similar to that of indicating a channel. An individual can be indicated by using @ and the user ID (e.g., @user1 and @jhmoon). Likewise, if a user ID including a predetermined identifier is included in the channel, the broker 332 can transmit the event message corresponding to the push message provided from the service provider only to the user terminal. Further, it is possible to exempt the user whose ID is "indigo" using an identifier as in the channel "blog/indigo" and "EX:ind/indigo."

Further, in FIG. 3, the subscription gateway 335 (FIG. 4) transmits at least one channel list linked with each service registered by the service provider 320 to the user terminal 340 according to the request from the user terminal 340. Here, the subscription gateway 335 transmits the user ID to the service provider 320 so that the service provider 320 can check the user's authorizations, and have the channel registration procedure.

The authenticated user terminal transmits the selection information for at least one channel selected by the user from the channel list provided in the subscription gateway 335, and the user information such as the user ID, password, unique terminal number and terminal model to the subscription gateway 335. As such, the subscription gateway 335 registers subscriber information including the selection information and the user information for each subscriber in the subscriber DB 336.

As such, the broker 332 can transmit the event message for the channel corresponding to the subscriber information by referring to the subscriber DB 336. Here, if the service subscriber's authorizations for a certain channel are changed or disappear, the service provider 320 should inform the subscription gateway 335 of the fact using a deregistration command for the channel of the subscriber. As such, the subscription gateway 335 removes the subscriber's authorizations from the subscriber DB 336 so that the event message is not transmitted to the subscriber terminal.

Figure 7:
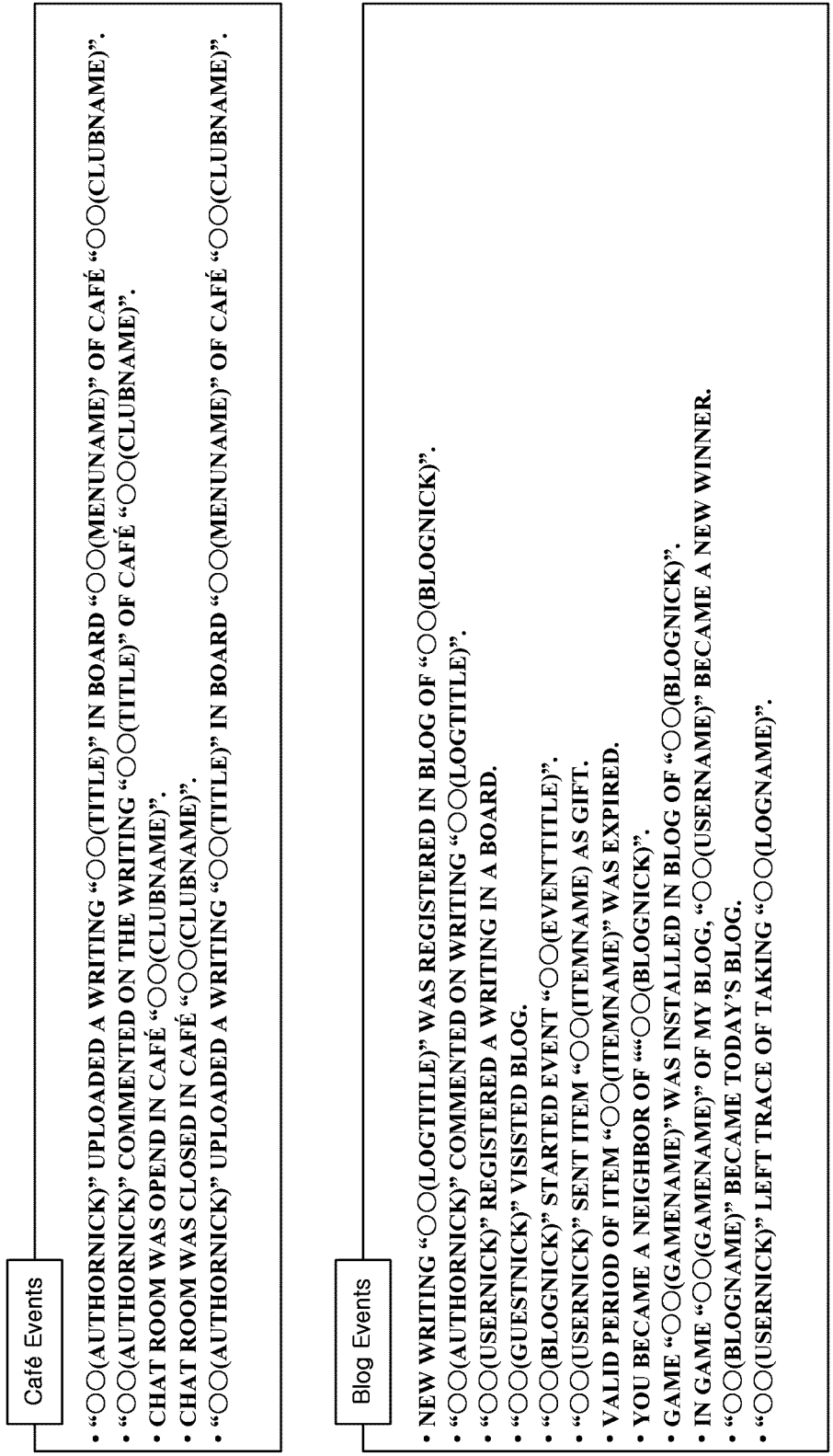
FIG. 7 illustrates generation of an event message according to an embodiment of the present invention.

FIG. 7 shows generation of an event message according to one embodiment of the present invention. For example, in an online community, an event (e.g., "OO wrote down a writing in OO bulletin board of OO community") can be pushed, and a member of the community can be pushed the event-related messages anytime and anywhere regardless of the type of his terminal.

Likewise, in an Internet blog, an event (e.g., "a new writing OO was registered in OO's blog") can be pushed, and a member of the blog can be pushed the blog event-related messages anytime and anywhere regardless of the type of his terminal.

Likewise, the present invention includes broker connections corresponding to the ubiquitous user terminals 340, and a directory in which the service provider 320 registers the service types, event types, event formats and meanings, so that any type of user terminal 340 can receive the event push service by referring to the directory. According to the service plan of the service provider, various events will be created and provided, and the user will automatically analyze and be provided events without the process of upgrading the UED-related clients even though the service is changed to another UED format.

Figure 8:
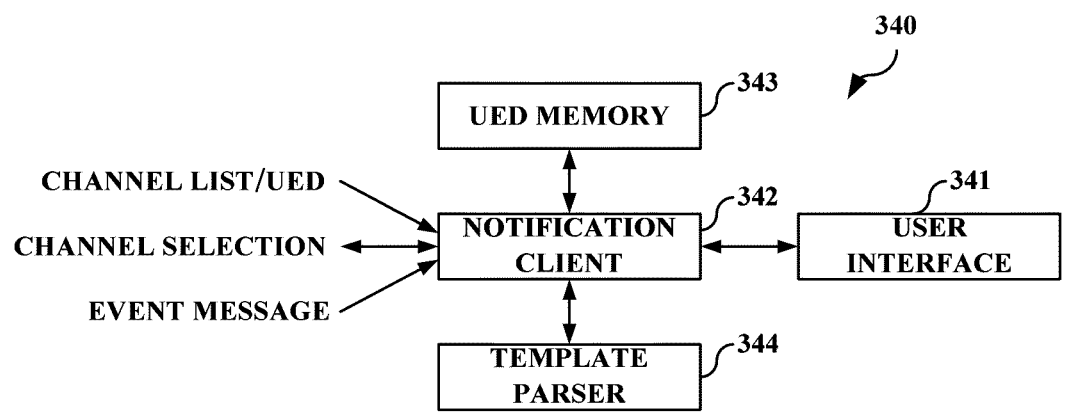
FIG. 8 is a specific block diagram of the user terminal of FIG. 3.

FIG. 8 is a specific block diagram of the user terminal of FIG. 3. Referring to FIG. 8, the user terminal 340 according to one embodiment of the present invention includes a user interface 341, a notification client 342, a memory 343 and a template parser 344.

As described above, the user terminal 340 comprehensively refers to not only TCP/IP-based Internet terminals and SMS-based mobile terminals, but also all ubiquitous terminals that are carried by a user or are installed inside, and can communicate in a wire/wireless manner.

For example, in the case where the user terminal 340 is a mobile phone that can receive SMS, it can be assumed that generally such a terminal is always turned on, and the terminal receives an event message through the broker 332 in charge of SMS of the ubiquitous notification server 330.

Further, in the case where the user terminal 340 is a terminal that can receive a general TCP/IP-based message, the terminal is connected to the broker 332 in charge of TCP/IP of the ubiquitous notification server 330 via the initial authentication procedure (in the case of the SMS device, the initial service subscription is the authentication procedure), and receives the event-related message.

Further, if there is a terminal interface that can be pushed an event message in a network that communicates in UDP (user datagram protocol) or P2P (peer to peer) method, it would be possible to be provided the event message in line with the interface. Here, the ubiquitous notification server 330 should include a fitting broker.

The user interface 341 includes a display means such as an LCD (Liquid Crystal Display), a voice output means such as a speaker, or a data input means such as a keypad and a touch screen as well as applications operating these means, and includes all means necessary for the user to handle various sets of information to fit in the user environment when the various sets of information are inputted and outputted.

The notification client 342 can transmit a request for registration for registering in the push relay service operated in the ubiquitous notification server 330, and transmit the UED request for being downloaded the UED file.

The notification client 342 receives at least one channel list linked with each service provided by the service provider 320 from the directory management unit 333 of the ubiquitous notification server 330 through the subscription request so that the user can select at least one of the channel lists, and generates subscriber information including the selection information for the selected channels and the user information (the user ID, password, terminal serial number, terminal type, etc.) for the used terminal so that the generated information can be transmitted to the subscription gateway 335 of the ubiquitous notification server 330.

As such, if the subscription gateway 335 registers subscriber information in the subscriber DB 336, later the notification client 342 can receive the event message for the channel corresponding to the selection information Likewise, the received event message is indicated through the user interface 341.

Further, the notification client 342 can receive a UED file related with the service or channel selected by the user from the directory management unit 333 of the ubiquitous notification server 330 through the UED request for downloading the UED file, and store the file in the memory 343. The directory management unit 333 already knows the UED where an appropriate data type was defined according to the specification of the terminal.

Further, when the notification client 342 requests a UED, the directory management unit 333 transmits a UED appropriate for the specification such as a terminal model to the subscriber terminal, or transmits an UED appropriate for the data type specified by the subscriber through the notification client 342 to the subscriber terminal.

As described above, the data type defined in the UED can be defined as an integer such as 8, 16 and 32 bits and a character string function to fit in various subscriber terminals. As such, the notification client 342 can receive an event message of a form according the binary protocol of the data type indicated in the UED file from the broker 332 of the ubiquitous notification server 330.

The notification client 342 can directly raise the received XML-type event message to an upper application for displaying the message, or can apply the received event message to the template included in the UED for displaying the message. For this, the terminal includes a template parser 344, and the template parser 344 extracts and analyzes a template that designates a message display form by parsing the UED file. As such, the user interface 341 can display the event message according to the binary protocol in a form applied in the template. This can be utilized in the case of a service that provides a simple alerting function.

Further, in order to increase richness of the template, the template can include font-related matters (color, thickness, size, etc.), or can include a form that can utilize resources such as images. Further, the program of the notification client 342 can be written so that the template can be generated as part of the full HTML (hypertext markup language) document. For example, when the user ID is received as a parameter, it is possible to be linked to the profile page.

Figure 10:
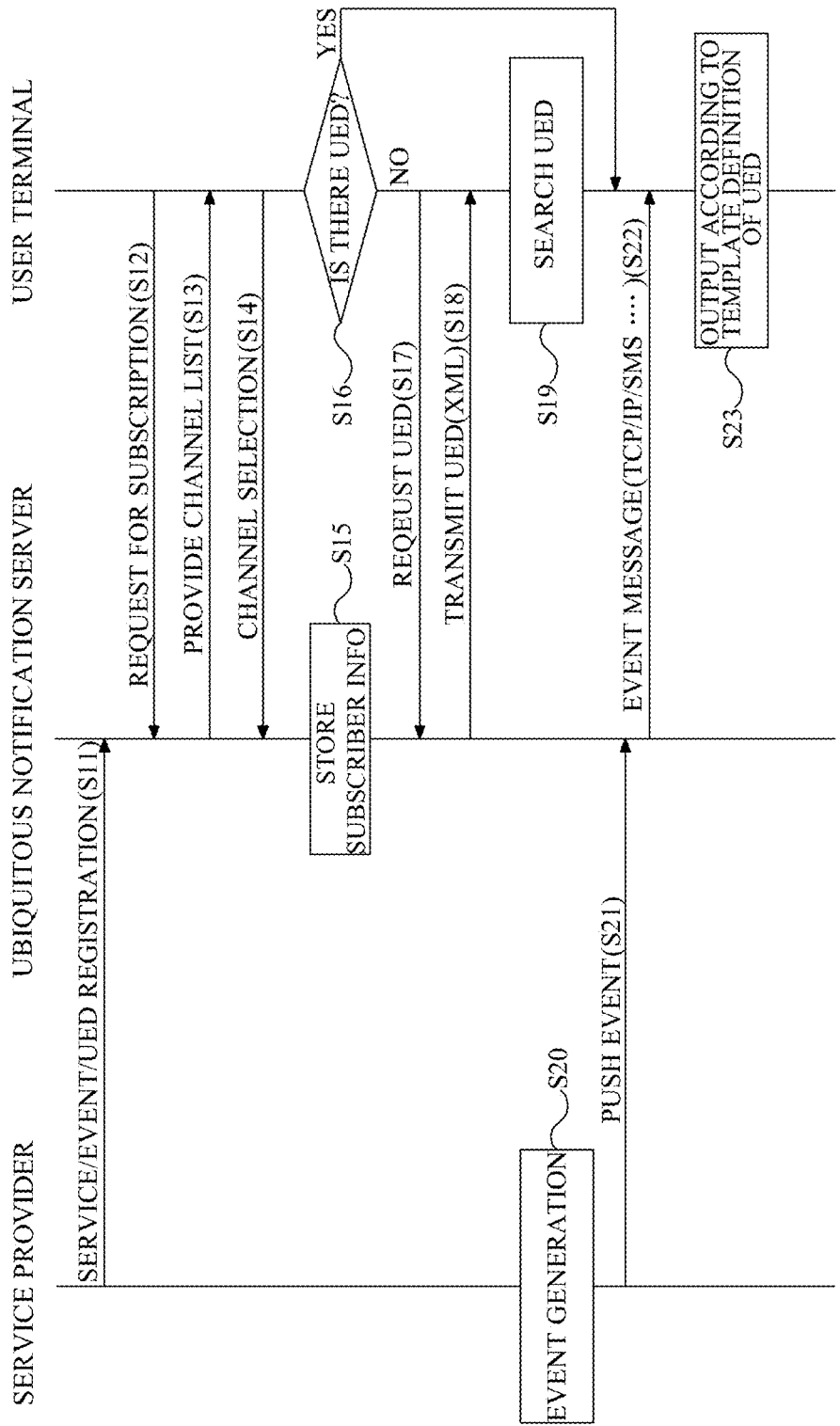
FIG. 10 is a flowchart illustrating a ubiquitous notification method according to an embodiment of the present invention.

Hereinafter, the flow of operation of the ubiquitous notification server according to an embodiment of the present invention will be described in detail with reference to the flowchart of FIG. 10.

First, in order to provide the event push service according to the relay platform of the ubiquitous notification server 330, the service provider 320 registers at least one channel linked with the service as shown in FIG. 6 including the service ID and event ID, and the XML-type UED file as provider information S11. The directory management unit 333 of the ubiquitous notification server 330 stores and manages provider information to the provider DB 334. Here, the UED file can be managed by channels or services.

Next, in order to be provided the event push service provided by the service provider 320, the user terminal 340 transmits the subscription request of the push service to the subscription gateway 335 of the ubiquitous notification server 330 S12. As such, if the subscription gateway 335 transmits at least one channel list linked with each service S13, the user terminal 340 selects channels intending to be pushed event messages from the channel list, and feeds back subscriber information including selection information about the selected channels, user information about the terminal (user ID, password, terminal serial number, terminal model, etc.) to the subscription gateway 335 S14.

As such, the subscription gateway 335 stores subscriber information provided from the user terminal 340 to the subscriber DB 336, and manages the information S15.

The user terminal 340 determines whether there is a UED file related with the selected channel S16. If there is no such file, the user terminal 340 transmits a UED file request appropriate for its terminal specification S17. As such, the user terminal 340 can receive a UED file downloaded from the directory management unit 333 S18, store the received file in a predetermined memory 343, and manage the file S19. The directory management unit 333 of the ubiquitous notification server 330 can refer to the terminal model, etc. at the time of a UED file request of the notification client 342, and transmit an appropriate UED file to the subscriber terminal, or can transmit an appropriate UED file in line with the data type designated by the subscriber to the subscriber terminal through the notification client 342.

Later, if an event is generated in the service provided by the service provider 320 S20, the service provider 320 pushes the corresponding event to the event gateway 331 of the ubiquitous notification server 330 S21. Here, as described above, the event can be pushed in a form according to the binary protocol of the data type defined in the UED file, or can be pushed in the XML format.

In one embodiment of the present invention, when an event is pushed, the list of subscriber terminals, which will be pushed the event, can be received together. As such, the ubiquitous notification server 330 transmits the message for the event in real time to the subscriber terminals disclosed in the list of subscriber terminals among user terminals 340 through the broker 332 S22.

Here, the broker 332 can transmit the event message in a communication method that is supported by the terminal such as TCP/IP or SMS-based method by distinguishing various types of each ubiquitous subscriber terminal. The broker 332 transmits the event message after including the event message in the XML-type data (payload) without distinguishing various types of each subscriber terminal when transmitting such an event message, but considering the small-scale resources of the subscriber terminal, it is desirable to transmit the event message after including the event message in the data according to the binary protocol defined in the data type (see FIG. 9) of the UED file supported by the terminal by distinguishing various types of each subscriber terminal.

The broker 332 can transmit the event message to the subscriber terminal in the channel unit by managing events in the channel unit that indicates the domain that the event belongs to for each service. In the case where at least one sub-channel is included in the lower side of the channel, the broker 332 can transmit the event message to all terminals that subscribe in a sub-channel. Further, in the case where the user ID including a predetermined identifier, which represents an individual, etc., is include in the channel, the event can be managed in a manner that only the user terminal corresponding to the user ID is transmitted the event message, or only the user terminal corresponding to the user ID is not transmitted the event message.

The subscriber terminal, which receives an event message for the channel according to the above subscriber information, can receive the event message in the form of XML, and can especially receive the event message in the form of data according to the binary protocol of the data type indicated in the UED file.

The subscriber terminal can display the message in the user interface 341 by analyzing the signal of the event message received from the broker 332 through the notification client 342. The notification client 342 processes an XML-type event message so that the message is displayed through the user interface 341, but especially, can convert the message display format according to the template included in the UED file using the template parser 344 S23. The template parser 344 can extract the UED file corresponding to the received event message among UED files stored in a predetermined memory 343 as a database by services or channels, and convert the message format to a form based on the template of the UED file by parsing the template included in the UED file. As such, the message can be indicated including various images and fonts.

According to the present invention described above, the user terminal 340 can output an event message according to predetermined standards, and can receive services by analyzing the protocol depending on the UED file, and requesting an event appropriate for the terminal. From this, not only is it possible to provide simple alerting functions such as an e-mail, a new writing, a note and a comment alert service in various ubiquitous terminals, but it is also possible for the manufacturing companies of ubiquitous terminals or a third party to provide a different-level of distinctive service by linking timely events such as finance, electronic commercial transactions, shopping and local information to event monitoring, statistics and detailed information, or an attempt to a re-linking event.

The functions used in the method and system disclosed in the present specification can be implemented as computer-readable codes in a computer-readable recording medium. The computer-readable recording medium includes all kinds of recording devices where data that can be read by a computer system are stored. Some examples of a computer-readable recording medium are a ROM, RAM, CD-ROM, magnetic tape, floppy disk and optical data storage devices. Further, the recording medium may be implemented in the form of a carrier wave (e.g., transmission through Internet). Further, the computer-readable recording medium is distributed to a computer system connected through a network so that computer-readable codes can be stored and executed in a distributed manner.

As apparent from the above description, according to the ubiquitous notification method and system, the list of subscribers is managed in a relay platform, and events of each service from the service provider 320 are integrated through one route, and are then integrally managed so that they are provided based on 3A (anytime, anywhere and regardless of the device), so the subscriber who receives the provided push-type event can integrally manage his own event profile, and the service provider 320 can provide the subscription authorizations of the event push service to a consistent interface.

Further, according to the present method and system, appropriate broker 332 connections corresponding to the ubiquitous user terminals 340, and directories where the service provider registers the service type, the event type, and the event format and meaning are operated so that any type of user terminal 340 can receive the event push service by referring to directories regardless of the type of the user terminal 340. As such, it is possible for the service provider 320 to create and provide various events according to a service plan, and it is convenient on the side of the user because he can be automatically provided an event message without the process of upgrading a client when the service changes.

Further, according to the present method and system, even though a large amount of events are generated in the peak time in the service provider 320, the events are integrated in a relay platform, and the integrally-managed events are distributed-processed or parallel-processed by services or events so that there is no limitation in the performance of processing super-high storage transactions of the server, so the service provider 320 can provide all types of events intended to be provided to the user regardless of the amount.

Further, according to the present method and system, such technologies are implemented through small modifications of the existing legacy service, so an integrated push service appropriate for ubiquitous devices can be provided, and ubiquitous connection rings that can be more closely adhered to the service can be provided to the user, thereby significantly contributing to the development of the service itself.

Further, according to the present method and system, the user terminal 340 can output an event message according to predetermined standards, and can analyze the protocol itself according to the UED file and use necessary events suitable to the terminal itself, so not only is it possible to provide simple alerting functions such as an e-mail, a new writing, a note and a comment alert service in various ubiquitous terminals, but it is also possible for the manufacturing companies of ubiquitous terminals or a third party to provide a different-level distinctive service by linking timely events such as finance, electronic commercial transactions, shopping and local information to event monitoring, statistics and detailed information, or an attempt to a re-linking event.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:
1. A notification method that uses a processor of a notification server connected to a plurality of service providers via an internet connection, each of the service providers being a separate server from the notification server and operating within a different local network, the notification server including a subscriber database having information associated with a plurality of subscriber terminals, the method comprising:
   maintaining, by the notification server, a service provider database, the service provider database containing information on the plurality of service providers including a first service provider and a second service provider;
   receiving, at the notification server, a first pushed event from the first service provider without the first service provider being polled for same, the first pushed event associated with a first service subscribed to by a first subscriber terminal, the first service provider configured to provide the first pushed event to the first subscriber terminal indirectly via the notification server;
   receiving, at the notification server, a second pushed event from the second service provider without the second service provider being polled for same, the second pushed event associated with a second service subscribed to by the first subscriber terminal, the second service provider configured to provide the second pushed event to the first subscriber terminal indirectly via the notification server;
   integrating, by the notification server, the first pushed event and the second pushed event to generate an event message; and
   transmitting the event message from the notification server to the first subscriber terminal such that the notification server acts as a relay between the plurality, of service providers and the first subscriber terminal.

2. The method of claim 1, further comprising:
   obtaining a list of subscriber terminals under service comprising the first subscriber terminal, wherein the list of subscriber terminals under service identifies a supported communication method of each of the subscriber terminals under service, and
   wherein transmitting the event message comprises transmitting the event message to the first subscriber terminal using a communication method that is supported by the first subscriber terminal.

3. The method of claim 2, wherein the communication method includes one or more methods of TCP/IP (Transmission Control Protocol/Internet Protocol), SMS (Short Message Service), UDP (User Datagram Protocol) and P2P (Peer to Peer).

4. The method of claim 1, further comprising:
   before receiving the pushed the event, receiving at least one channel linked with the service provided from a service provider and receiving a UED (UnotS Event Description) file from the service provider to register the channel and the UED file as provider information,
   wherein the event is pushed in a data format indicated in the UED file.

5. The method of claim 4, wherein the UED file is configured in an XML (eXtensible Markup Language).

6. The method of claim 1, wherein transmitting the event message comprises transmitting the event message in a data form according to a binary protocol of a data type supported by the first subscriber terminal.

7. The method of claim 1, wherein transmitting the event message comprises transmitting the event message in an XML-type data form, regardless of each subscriber terminal-type.

8. The method of claim 1, further comprising:
   transmitting a channel list of at least one channel linked with the first service to the first subscriber terminal in response to a request from the first subscriber terminal; and
   registering selection information about at least one channel selected by a user of the first subscriber terminal from the channel list, and user information corresponding to the first subscriber terminal as subscriber information,
   wherein transmitting the event message comprises transmitting the event message for the channel according to the subscriber information.

9. The method according to claim 8, further comprising:
   transmitting a UED file for an interface with the user to the first subscriber terminal in
   response to the request of the first subscriber terminal after registering the subscriber information.

10. The method of claim 9, wherein transmitting the UED file comprises transmitting the event message in a data form according to a binary protocol of a data type indicated in the UED file.

11. The method of claim 9, wherein the UED file comprises a template that indicates a message display format, and the event message for the channel is converted into a format based on the template by parsing the UED file on the first subscriber terminal.

12. The method of claim 1, further comprising:
   managing the first pushed event in a channel unit that represents a domain that the first pushed event belongs to for each service after receiving the first pushed event,
   wherein transmitting the event message comprises transmitting the event message in the channel unit.

13. The method of claim 12, further comprising:
   transmitting the event message to a terminal subscribed in at least one sub-channel when the channel unit comprises at least one sub-channel.

14. The method according to of claim 12, wherein managing the first pushed event comprises only a user terminal corresponding to a user ID receives the transmitted event message, or only the user terminal corresponding to the user ID does not receive the transmitted event message when the channel unit includes the user ID including an identifier.

15. A non-transitory computer-readable medium encoded with a program for performing the method of claim 1.

16. The notification system of claim 1, wherein the plurality of service providers are configured to transmit pushed events directly to one or more other subscriber terminals not associated with the notification server.

17. A method of providing an event in a terminal from a notification server, the method comprising:
   transmitting a subscription request of a push service to the notification server;
   receiving a channel list of at least one channel linked with the push service in response to the subscription request, the channel list containing a plurality of push services organized by channels, the plurality of push services associated with a plurality of service providers connected to the notification server via a network;
   transmitting, to the notification server, subscriber information including user information corresponding to the terminal and selection information for at least one channel selected by a user from the channel list, the subscriber information instructing the notification server to subscribe the terminal to the channel indicated by the selection information; and
   receiving, from the notification server, an event message originating from one of the plurality of service providers, the event message being for the channel corresponding to the subscriber information.

18. The method of claim 17, further comprising after transmitting the subscriber information:

transmitting a request for a UED file for an interface with a user; and receiving a UED file in response to the UED file request.

19. The method of claim 18, wherein receiving the event message comprises receiving the event message in a data form according to a binary protocol of a data type indicated in the UED file.

20. The method of claim 18, further comprising after receiving the UED file:

converting the event message for the channel into a form based on a template by parsing the UED file when the UED file comprises the template that indicates a message display format.

21. A terminal to receive an event from a notification server, the terminal comprising:

a notification client configured to, receive a channel list of at least one channel linked with a push service through a request for an event push service subscription, the channel list containing a plurality of push services organized by channels, the plurality of push services associated with a plurality of service providers, each of the plurality of service providers being a different server from the notification server and connected to the notification server via a network, generate and transmit subscriber information including selection information for at least one channel selected by a user from the channel list and user information corresponding to the terminal, the subscriber information instructing the notification server to subscribe the terminal to the channel indicated by the selection information, and receive, from the notification server, an event message originating from one of the plurality of service providers, the event message being for a channel corresponding to the selection information; and a display device configured to display the event message received by the notification client.

22. The terminal of claim 21, further comprising:

a memory configured to store a UED file for the display device, wherein the UED file is received through a request for the UED file transmitted by the notification client.

23. The terminal of claim 22, wherein the notification client is configured to receive the event message in a data form according to a binary protocol of a data type indicated in the UED file.

24. The terminal of claim 22, further comprising:

a template parser configured to extract and analyze a template that indicates a message display format by parsing the UED file, wherein the user interface displays the event message in a form based on the template.

25. A notification system connected to a plurality of service providers via a network, each of the service providers being a separate server from the notification system, the notification system comprising:

a service provider database configured to maintain a list of the plurality of service providers including a first service provider and a second service provider;

an event gateway configured to, receive a first pushed event from the first service provider without the first service provider being polled for same, the first pushed event associated with a first service subscribed to by a first subscriber terminal, and receive a second pushed event from the second service provider without the second service provider being polled for same, the second pushed event associated with a second service subscribed to by the first subscriber terminal;

a push engine configured to integrate the first pushed event and the second pushed event to generate an event message if the first service provider and the second service provider are in the provider list; and at least one broker device configured to transmit the event message to the first subscriber such that the notification system acts as a relay between the plurality of service providers and the first subscriber terminal.

26. The system of claim 25, wherein the push engine is configured to obtain a list of subscriber terminals under service comprising the first subscriber terminal, wherein the list of subscriber terminals under service identifies a supported communication method of each of the subscriber terminals under service, and the broker device is configured to transmit the event message to the first subscriber terminal using a communication method that is supported by the first subscriber terminal.

27. The system of claim 25, wherein the broker device is configured to transmit the event message in a data form according to a binary protocol of a data type that is supported by the first subscriber terminal.

28. The system of claim 25, further comprising:

a directory management unit configured to receive at least one channel linked with the first service, and a UED file provided by the first service provider, and to register the at least one channel and the UED file as provider information in a database, wherein the first event is pushed in a data format indicated in the UED file through reference to the database in the event gateway.

29. The system of claim 28, wherein the directory management unit transmits the UED file for an interface with a user to a user terminal in response to a request of the user terminal.

30. The system of claim 29, wherein the broker device is configured to transmit the event message in a data form according to a binary protocol of a data type indicated in the UED file.

31. The system of claim 28, wherein the directory management unit manages the pushed event in a channel unit that represents a domain that the first pushed event belongs to for the first service, and the broker device is configured to transmit the event message in the channel unit.

32. The system of claim 31, wherein the broker device is configured to transmit the event message to the first terminal that has subscribed to at least one sub-channel when the channel unit includes at least one sub-channel.

33. The system of claim 31, wherein the broker device is configured to transmit the event message only to a user terminal corresponding to a user ID, or not transmit the event message only to the user terminal corresponding to the user ID when the channel unit comprises the user ID including an identifier.

34. The system of claim 25, wherein the broker device is configured to transmit the event message in an XML-type data form.

35. The system of claim 25, further comprising:

a subscription gateway configured to transmit a channel list of at least one channel linked with the service to a user terminal in response to a request from the user terminal, and to register user information for the user terminal and selection information about at least one channel selected by a user from the channel list as subscriber information in a database, wherein the broker is configured to transmit an event message for a channel corresponding to the subscriber information with reference to the database.

36. The notification system of claim 25, wherein the plurality of service providers are configured to transmit pushed events directly to one or more other subscriber terminals not associated with the notification system.

37. A notification system for providing notification from a plurality of service providers to a subscriber terminal, the system comprising:

a connector device configured to collect a plurality of events pushed from the plurality of service providers, the connector device connected to the plurality of service providers via a network, the plurality of service providers being separate servers from the system, the plurality of service providers each being configured to provide the plurality of events to the subscriber terminal via the system such that the system acts as a relay where all of the plurality of events from the separate servers are routed therethrough;

a provider database configured to maintain a list of the plurality of service providers;

a push engine configured to integrate a plurality of events collected by the connector device and integrally manage the events in response to a determination that the plurality of service providers are in the provider list: and a transmitter to transmit an event message of a data type supported by the subscriber terminal, wherein the subscriber terminal is registered to subscribe to at least one event reception intended to be pushed among the plurality of events using a communication method that is supported by the subscriber terminal.

38. The notification system of claim 37, wherein the plurality of service providers are configured to transmit pushed events directly to one or more other subscriber terminals not associated with the notification system.

* * * * *